April 21, 1925.
R. L. PEUGH
TIRE BOOT
Filed Nov. 20, 1924
1,534,989
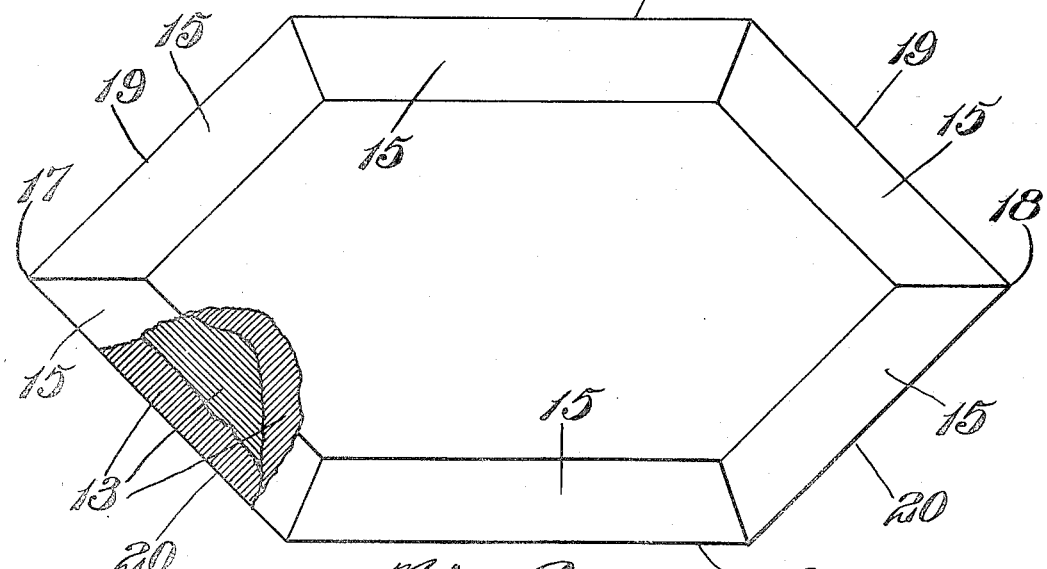
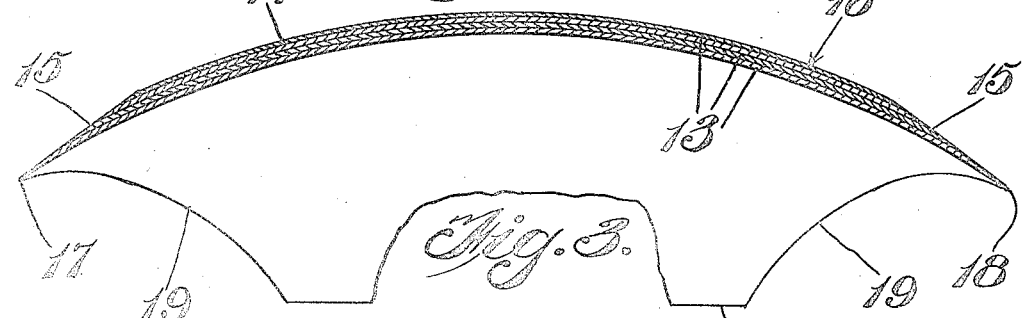
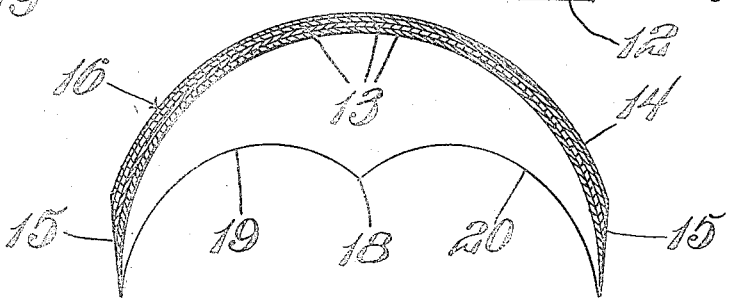
Inventor
Ray L. Peugh
Watson E. Coleman
Atty Patented Apr. 21, 1925.

1,534,989

UNITED STATES PATENT OFFICE.

RAY LELAND PEUGH, OF OKLAHOMA CITY, OKLAHOMA.

TIRE BOOT.

Application filed November 20, 1924. Serial No. 751,170.

*To all whom it may concern:*

Be it known that I, RAY LELAND PEUGH, a citizen of the United States, residing at Oklahoma City, in the county of Oklahoma and State of Oklahoma, have invented certain new and useful Improvements in Tire Boots, of which the following is a specification, reference being had to the accompanying drawings.

This invention relates to improvements in the construction of tire boots and more particularly to the construction of internal boots or blow-out patches.

An important object of the invention is to provide a device of this character particularly adapted for use in conjunction with balloon tires and due to its formation places no undue stress upon the cords from which the body of the tire is formed.

As is well known to those familiar with the art, the body or carcass of cord tires and particularly balloon tires is formed of a plurality of diagonally extending cords. In the balloon tire the walls and tread of the tire are thin and flexible and accordingly an ordinary square ended boot inserted in the tire would provide a relatively abrupt shoulder extending transversely of the tire and accordingly across these cords. This abrupt shoulder causes the outer surface of the tire to have, in effect, a similar shoulder which coming into engagement with the surface of the road during rotation of the tire causes continued hammering blows to be applied to the walls of the tire at the shoulder during the movement of the vehicle and this has a tendency to strain and finally break the cords of the carcass with the result that the thin rubber wall of a balloon tire is soon destroyed and a second blow-out will occur.

Accordingly a further object of the invention is to so construct the boot that the edge or shoulder is materially reduced and extends in the same direction as the cords so that the strain applied is upon rubber between adjacent cords and not upon the cords themselves.

A further object of the invention is to provide a device of this character which will so firmly connect itself to the inner walls of the tire that the entrance of sand, small stones, and the like, through the opening formed by the blow-out is prevented.

These and other objects I attain by the construction shown in the accompanying drawings, wherein for the purpose of illustration is shown a preferred embodiment of my invention and wherein:—

Figure 1 is a plan of the outer face of a tire boot constructed in accordance with my invention, a portion of each of the several layers being broken away to show the construction of the device;

Figure 2 is a longitudinal sectional view through the boot;

Figure 3 is a transverse sectional view;

Figure 4 is an enlarged section through one edge of the boot showing how the adhesive is applied thereto.

Referring now more particularly to the drawings, the patch comprises a body in the form of a rectangle having diagonally opposed corners truncated as indicated at 11 and 12, these truncated sections forming the side of the patch. As will be obvious from a comparative inspection of Figures 2 and 3 this body is curved both longitudinally and transversely to conform to the shaping of the casing within which it is to be disposed. The body is formed of a plurality of layers 13 of cord material, the cords of adjacent layers being disposed in opposite directions and a cured rubber sheet 14 is applied to one face of the body. The layers of material and rubber sheet are secured together by a suitable adhesive and the side edges of the sheet at that face thereof bearing the rubber sheet 14 are skived as indicated at 15 to provide a tapering edge, the end of the taper being very thin and flexible. To the outer face of that surface of the sheet having the skived edges and to the rubber layer 14 is applied a coating of adhesive 16 covering the entire surface of the body and preferably of such a nature that moistening with gasoline or benzine increases its adhesive qualities. The opposite or inner face of the body which may be termed the convex face of the body is covered with soap stone or simply left plain as may be desired.

In the use of the device, the patch before applying to the tire has the outer surface thereof thoroughly moistened with gasoline and the entire surface of the tire to which the patch is to be applied is thoroughly cleaned and moistened with the same material. The patch is then placed in position so that the center thereof comes over the break of the casing with the pointed ends 17 and 18 thereof directly longitudinally of the tire. The tube is then placed in position, the tire placed upon the rim and inflated with the result that the tube under these conditions will force the outer surface of the patch firmly into engagement with the walls of the casing throughout the entire body. The diagonally converging sections 19 and 20 of the end edges of the body will then be parallel to the diagonal cords of the tire carcass. The pointed ends being relatively thin and flexible will not transmit any abrupt shock to the tire when the portion of the tire at which the patch is arranged comes into engagement with the ground and any shock which is formed, as hereinbefore stated, will be in a line with the cords of the tire and not transversely of these cords as with the usual square ended patch, the shock being gradually absorbed. The adhesive being applied to the entire outer or convex surface of the patch its inner surface will become attached to the tire and due to the heat and pressure to which it will be subjected will eventually become firmly attached to the interior of the casing. It will accordingly be impossible for stones, sand, water and the like, to enter through the opening formed by a blow-out and furthermore since this substantial surface of the patch is adhesively secured to the walls of the casing, spreading of the opening formed by the blow-out could only be accomplished by actual stretching of the patch which is practically impossible, therefore, undue strain upon that portion of the patch aligning with this opening is prevented.

It will thus be obvious that certain changes in the structure may be resorted to without materially departing from the spirit of my invention and I accordingly do not limit myself to such specific structure except as hereinafter claimed.

I claim:—

1. An internal tire boot comprising a body having each end edge thereof in two diagonal sections converging to a point, that side of the body adapted to confront the inner wall of the tire being skived to produce tapering edges and being completely covered with an adhesive to attach it to the tire.

2. An internal tire boot comprising a body having each end edge thereof in two diagonal sections converging to a point, that side of the body adapted to confront the inner wall of the tire having applied thereto a layer of cured rubber and being skived to produce tapering edges and then completely covered with an adhesive whereby to attach it to the tire.

3. An internal tire boot comprising a body curved transversely and longitudinally to conform to the curvature of the tire with which it is adapted to coact, the end edges of the body being each formed in two diagonal sections converging to a point, that side of the body adapted to confront the inner wall of the tire being skived to produce tapering edges and being completely covered with an adhesive to attach it to the tire.

4. An internal tire boot comprising a body formed of a plurality of layers of cord material, said layers having the cords thereof extending alternately in directions at right angles to one another, the body being transversely and longitudinally curved to conform to the transverse and longitudinal curvature of the tire with which it is to coact and having each end edge thereof in two diagonal sections converging to a point.

5. An internal tire boot comprising a body formed from a plurality of layers of cord material, said layers having the cords thereof extending alternately in directions at right angles to one another, the body being transversely and longitudinally curved to conform to the transverse and longitudinal curvature of the tire with which it is to coact and having each end edge thereof in two diagonal sections converging to a point, that side of the body adapted to confront the inner wall of the tire being skived to produce tapering edges and being completely covered with an adhesive whereby to attach it to the tire.

6. An internal tire boot comprising a body formed from a plurality of layers of cord material, said layers having the cords thereof extending alternately in directions at right angles to one another, the body being transversely and longitudinally curved to conform to the transverse and longitudinal curvature of the tire with which it is to coact and having each end edge thereof in two diagonal sections converging to a point, that side of the body adapted to confront the inner wall of the tire having applied thereto a layer of cured rubber and being skived to produce tapering edges, the rubber layer and the skived edges being completely covered with adhesive whereby to attach it to the tire.

In testimony whereof I hereunto affix my signature.

RAY LELAND PEUGH.